Figure 1:
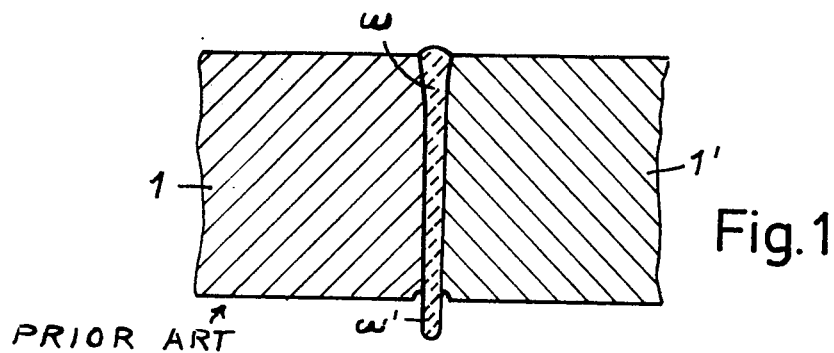

United States Patent

Kuhnen

[11] 4,063,062
[45] Dec. 13, 1977

[54] ELECTRON BEAM WELDING TECHNIQUE FOR JOINING TWO WORKPIECES TOGETHER

[75] Inventor: Gottfried Kuhnen, Oberrohrdorf, Switzerland

[73] Assignee: BBC Brown Boveri & Company Limited, Baden, Switzerland

[21] Appl. No.: 624,471

[22] Filed: Oct. 21, 1975

[30] Foreign Application Priority Data

Oct. 28, 1974 Switzerland .................. 14398/74

[51] Int. Cl.² .................................................. B23K 9/00
[52] U.S. Cl. .......................... 219/121 EM; 219/59; 219/60 R; 219/61; 219/137 R
[58] Field of Search ...... 219/121 L, 121 LM, 121 EB, 219/121 EM, 137 R, 59, 60 R, 61

[56] References Cited

U.S. PATENT DOCUMENTS

| | | | |
|---|---|---|---|
| 2,350,716 | 6/1944 | Eissout et al. | 219/137 R X |
| 2,945,942 | 7/1960 | Flynn et al. | 219/137 R |
| 2,996,600 | 8/1961 | Gardner, Jr. et al. | 219/61 |
| 3,003,601 | 10/1961 | Ott | 219/137 R X |
| 3,183,066 | 5/1965 | Lessmann et al. | 219/137 R X |
| 3,448,240 | 6/1969 | Steigerwald | 219/121 EM |
| 3,458,224 | 7/1969 | Freese | 219/137 R X |

OTHER PUBLICATIONS

Metals Handbook, vol. 6, "Welding and Brazing", 8th Ed. pp. 539–540, 1971.
Metals Handbook, vol. 6, "Welding and Brazing", 8th Ed. pp. 148–151 & 223 & 233, 1971.

*Primary Examiner*—J. V. Truhe
*Assistant Examiner*—Mark Paschall
*Attorney, Agent, or Firm*—Pierce, Scheffler & Parker

[57] ABSTRACT

In the preparation of plane or curved workpieces for welding together by means of an electron beam and wherein the weld takes the form of a full penetration joint, fusion lips are provided at the place where the lower welding bead forms. In the case where the workpieces are constituted by rotationally symmetrical thick-walled hollow bodies such as rotor discs for construction of turbo-machines which upon welding together form a closed cavity, the fusion lips have an annular configuration and are located at the inner radial contour of the welding interface. The workpieces are also provided with an arrangement for centering the lips and a metal foil is inserted between the lips to improve the toughness of the weld material, the foil having a carbon content lower than that of the parent metal of the workpieces.

2 Claims, 6 Drawing Figures

ELECTRON BEAM WELDING TECHNIQUE FOR JOINING TWO WORKPIECES TOGETHER

This invention concerns plane or curved workpieces prepared for electron beam welding, the weld taking the form of a full-penetration joint.

Welding with electron beams presents the possibility of joining thick-walled materials, such as are used for example in turbo-machine rotors composed of discs and drums, in a single operation.

With deep welds of this kind, however, the formation of the lower bead presents problems. Tests have shown that even with transverse and longitudinal oscillation of the electron beam and complete penetration of the cross-section of the workpiece, the lower bead exhibits frequent excessive local penetration of uneven length. Such excessive local penetration can be seen in FIG. 1 of the accompanying drawings described below. It is bounded at the sides by pronounced notches which, owing to the high hardness values in this region, can be the starting point of cracks. To avoid lower beads of this kind, complete penetration of the workpiece cross-section is often dispensed with. The electron beam or fused zone is made to terminate in a base piece, as illustrated in FIG. 2, described below. The disadvantage of this solution, however, lies in the danger that when the fused zone freezes, or later for example when the workpiece is subjected to cyclic bending stress, the remaining gap created by the base piece and directed towards the weld may propagate as a crack into the weld material or into the heat-affected zone of the parent material. This is promoted also by the great hardness in the region of the seam, owing to the extremely high cooling rates of electron beam welds.

The object of the invention is to give to workpieces for electron beam welding such a shape at the joint interface and in the region of the interface that a notch-free lower bead is achieved with a full-penetration weld.

This objective is achieved in that a fusion lip is provided on at least one of the workpieces at the place at which the lower bead forms in the case of full-penetration welding.

It is particularly effective if the fusion lip has the approximate shape of a quarter circle on the side away from the weld interface and has a thickness at the electron beam exit point at least equal to the diameter of the electron beam.

Besides the notch-free lower bead thus attainable, there is the further advantage that cooling of the weld material and heat-affected zone in the region of the fusion lip of the invention takes place less abruptly, and hence hardness values in this area are lower than in the remainder of the seam.

In the case of rotationally symmetrical workpieces, for example discs or drums, which are to be joined at their flat surfaces, it is recommended that the fusion lip should be annular in shape and located at the inner radial contour of the weld interface, a workpiece centering device being provided preferably outside the plane of the welded joint in the interests of complete penetration.

If an outer centering device is provided in the region of the indispensable extra filler material, this has the advantage of not impairing complete penetration between the workpieces. It is also possible to join the individual workpieces outside the vacuum chamber prior to electron beam welding, in which case tack welds can be provided at the centering device, these preferably extending over only a part of the workpiece circumference.

If rotationally symmetrical hollow bodies are involved, centering these on the inside offers the same advantages as stated above. In this case the workpieces can be provided with a ridge protruding radially inwards and forming a lip-centering device. A means of centering of this nature results in a greater effective depth of weld in that a much smaller amount of filler material is needed at the outer circumference.

When welding hollow bodies it is absolutely essential that pressure-compensating vents are provided. A particularly beneficial arrangement is one whereby one of the surfaces to be welded incorporates slots, the depth of which perpendicular to the joint plane is smaller than half the diameter of the electron beam, and which are so arranged that, on welding, the hollow cavity is connected to the inside of the vacuum chamber until shortly before welding is complete.

If the workpieces are exposed in service to a large alternating load, as in the case for example with rotor discs for turbomachines, they can advantageously be provided with a ring-shaped ridge which extends radially inwards in the region of the joint and merges into the fusion lip. Depending on the expected stress pattern, the fusion lip can be withdrawn inside the ridge, or project from it.

If the weld material is required to be particularly tough in the region of the lower bead, this can be achieved by inserting a suitably alloyed foil into the fusion lip. The thickness of the foil is preferably equal to the diameter of the electron beam.

Figure 3:
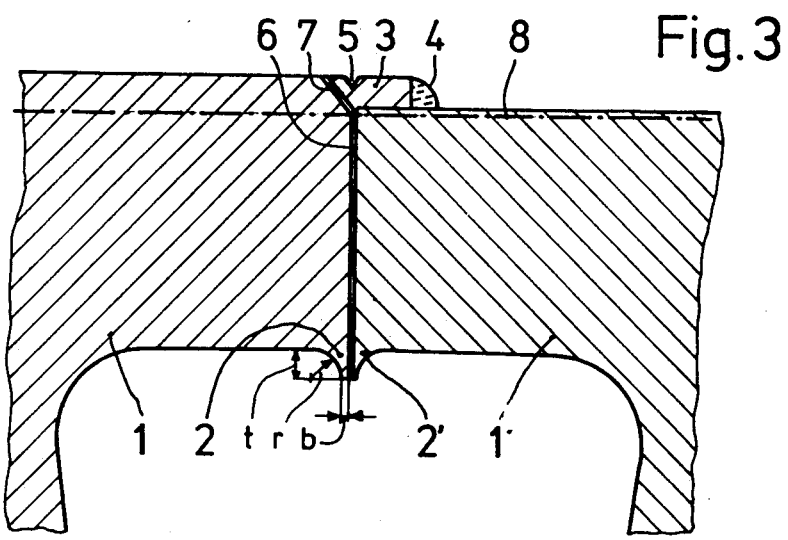
Figure 4:
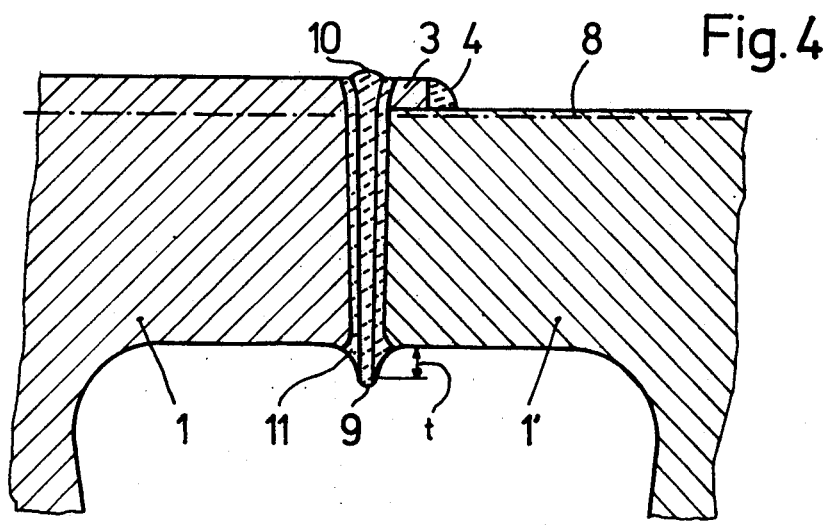
Figure 2:
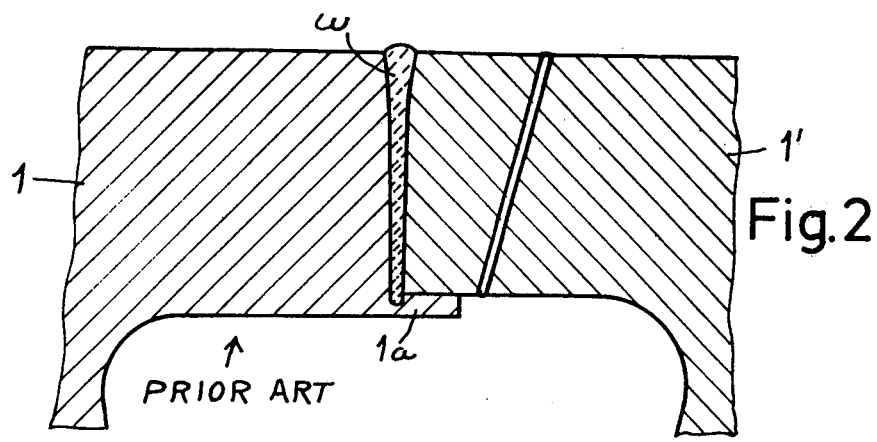
Figure 5:
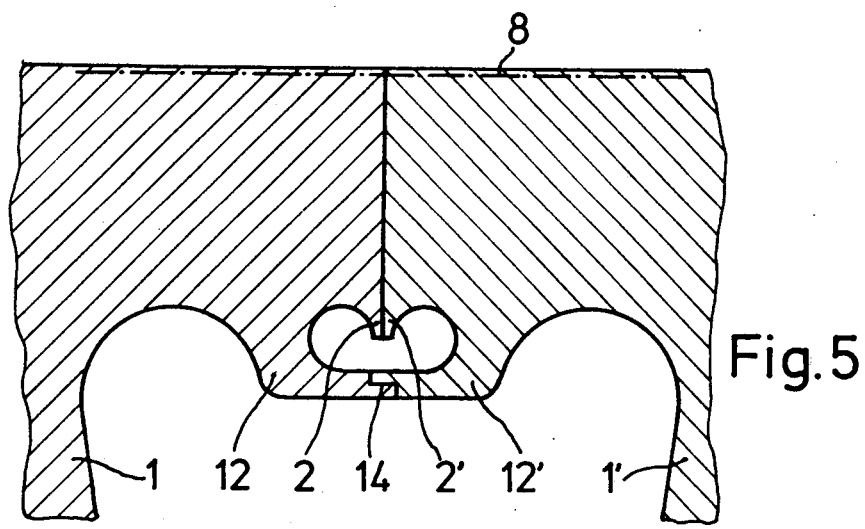
Figure 6:
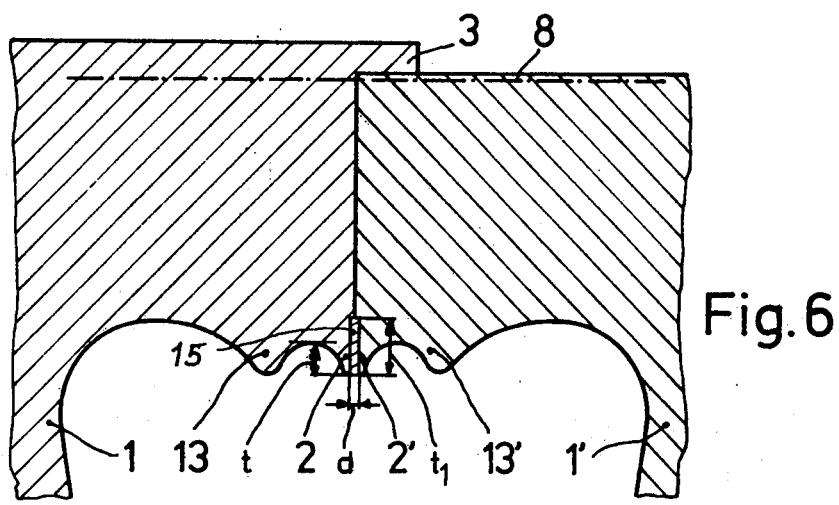

The invention will now be explained by means of examples with reference to the accompanying drawings, in which:

FIG. 1 shows a first known welded joint,

FIG. 2 shows a second known welded joint, represented by a part section of a turbine rotor, FIG. 3 shows a prepared welded joint according to the invention, represented by a part section of a turbine rotor, FIG. 4 shows a completed welded joint of the arrangement depicted in FIG. 3, FIG. 5 shows a first alternative of the arrangement depicted in FIG. 3, and FIG. 6 shows a second alternative of the arrangement depicted in FIG. 3.

In all the FIGS., 1 and 1' denote the two workpieces to be welded. Otherwise, identical reference symbols are used for corresponding parts.

FIGS. 1 and 2 show welded joints mentioned in the introduction of this description and conforming to the present state of the technology. In FIG. 1, the lower bead w' of the weld material w is shown as an uneven burr of excess penetration, bounded at the sides by pronounced notches. The part section in FIG. 2 shows two turbine discs, welded at their flat surfaces with an internal centering device, the centering extension 1a of workpiece 1 serving as the bottom of the weld. With this configuration it is not possible to locate the indispensable pressure-compensating vents 16 in the plane of the weld. For this reason they are positioned to the side as shown and have the effect of weakening the cross-section, and later have to be sealed.

To make the invention more easily understood, the general problem of electron beam welding, in itself well known, is recapitulated briefly below with reference to thick-walled turbomachine rotors composed of discs and drums.

The objective is to achieve joints free from pores and cracks, with a uniform root and a raised upper bead. Deep welds therefore need a high-frequency, oscillated electron beam, which in turn requires considerable surplus power.

At low welding speeds, full-penetration welds with the beam vertical can easily cause the weld pool to collapse.

Welding thick-walled, rotationally symmetrical hollow bodies of small outside diameter at constant angular velocity gives rise to large differences in welding speed between inside and outside surfaces of the workpieces, leading to differences in heat transfer conditions.

With circular seams, regions of overlap are particularly critical. The lengths of overlap should be kept as small as possible, as repeated melting is undesirable. This is an argument against using several beams simultaneously round the workpiece.

Maximum gap widths of 0.2 - 0.3 mm are permissible. Even very small gaps can be properly fused only if a certain minimum volume is melted by moving the electron beam transversely. This necessary transverse oscillation reduces the feed rate.

To achieve the required geometry of the seam, and in particular the minimum gap width, it is essential that the workpieces to be welded are centered extremely exactly.

An important aspect of the invention in this connection is that centering is under no circumstances effected in the fusion lip(s) of the invention, and therefore centering cannot in the present case be as shown in FIG. 2.

In FIG. 3 both workpieces 1 and 1' are each provided with a fusion lip 2 and 2', respectively. In the example shown, the depth $t$ of the lips is equal to the radius $r$ of a quadrant shape. The width $b$ of the fusion lip is approximately equal to the diameter of the electron beam employed. These are, of course, only indicative values, as the dimensions of the lip are dependent in particular on the beam diameter, the amplitude of the transverse beam oscillation and the energy supplied to the beam exit point. The two workpieces, which represent rotor discs, have an outer centering device 3 and are joined without distortion by a tack weld 4. This tack weld 4 can be made with a conventional welding technique and must not extend round the whole circumference of the workpieces. Individual, evenly spaced welds of defined length are sufficient to counteract the distortion caused when the joint is welded with only one electron beam gun. These tack welds also allow the two discs to be fitted together outside the vacuum chamber. There is thus no need for the usually complicated and expensive jigs in the vacuum chamber, and so the latter is then occupied solely for welding and any necessary preheating. Since this measure also results in minimum distortion of the rotor during welding, it is no longer necessary to work simultaneously with a number of electron beam guns spaced round the joint. The centering device 3 incorporates a marker groove 5 for aligning the electron beam gun exactly over the gap. To allow the essential equalization of pressure between the inside of the workpiece and atmosphere, in the present case a vacuum chamber of course, the workpieces 1 and 1' are provided with pressure-compensating holes 7 or slots 6. These must be of such a shape that they are narrower than the subsequent weld and are completely melted during welding. As a rule of thumb here it can be taken that the depth of the pressure-compensating slots 6 perpendicular to the plane of the gap should be less than half the diameter of the electron beam. The centering device 3 and also the tack welds 4, marker groove 5 and the pressure-compensating holes 7 are within the region of the surplus material, which is thereafter removed down to by the broken line 8, which then represents the subsequent final contour of the welded discs.

The operating principle of the invention will now be explained with reference to the finished weld shown in FIG. 4.

A uniform upper bead 10 without heavy scaling is obtained. This is because of the high rotational velocity at the outer disc diameter which results in an easily controllable, thin molten layer moving ahead of the electron beam.

Weld material does not fall through the beam exit point. Instead, a neat lower bead 9 is formed brought about by the fact that as the electron beam passes through the fusion lip, around it there forms a weld pool which is wider than the rest of the seam and runs out in a half circle into the quadrantshaped radii at the sides of the lip, where it freezes. Furthermore, the weld material and the heat affected zone 11 in the region of the lip cool less abruptly, and so here lower hardness values occur than in the rest of the seam.

According to FIG. 3, the workpieces 1 and 1' are provided with an outer centering device 3. A possible alternative arrangement to this is shown in FIG. 5. In the region of the inside radius of the joint the rotor discs are provided with a ringshaped ridge 12, 12'. With an arrangement of this kind, where the ridges 12, 12' terminate in overlapped centering extensions 14 in radial alignment with the lips 2, 2' and serve to center the same, it is possible to allow for less filler material at the outside diameter of the workpiece.

In FIG. 6 the workpieces 1 and 1' are each provided with a ringshaped ridge 13, 13' which projects radially inwards and adjoins the fusion lips 2, 2'. The ridge is so designed that it is in an area where the alternating bending stresses of the rotor when in operation are of no effect. In this way, the lips 2, 2' are similarly in an almost load-free or stress-free zone, and any irregularities in the weld can no longer be a possible starting point for cracks. As an alternative to the arrangement shown, the fusion lips 2, 2' could of course protrude from the ridges 13, 13'. In FIG. 6, centering of the lips 2, 2' is effected at the outside by means of the extension 3 on workpiece 1.

In the same FIG. 6 the joint interface between the rotor discs is provided in the region of the fusion lips 2, 2' with an annular slot into which a ring-shaped metal foil 15 is inserted. This has preferably a thickness $d$ equal to the beam diameter, and a height $t_1$ of approximately 1 -2 times the height $t$ of the fusion lip. The purpose of this metal foil, which has an analysis different from that of the parent material of the rotor discs, is to improve the mechanical properties, in particular the toughness, of the weld material. In the present example it is assumed that the workpieces are of a heat-treated alloy steel with a carbon content of about 0.2 - 0.25 %. The metal foil employed has a carbon content of about 0.02 - 0.05 %.

The action of the foil is that, on welding, the carbon content of the weld material and also other critical elements, depending on the composition of the metal foil, are diluted. Owing to the high energy density of the electron beam, the structure in the fusion zone is little affected. Because of the dilution, hardening in the weld seam does not take place, as otherwise normally occurs owing to the high carbon content alone, or owing to carbon in conjunction with the alloying elements, such as manganese, molybdenum, chromium, nickel, etc.

With electron beam welding in a vacuum, the traces of oxygen always present on the bare metal surface of the prepared joint, and also oxide inclusions containing oxygen in the steel, react with the carbon of the steel to produce carbon monoxide gas. In a vacuum this gas assumes a very large volume which, particularly with very deep electron beam welds, leads to severe pore formation in the molten material. For this reason it is expedient to alloy the metal foil with a sufficient quantity of deoxidizing agents which at least partly inhibit the formation of CO due to residual oxygen. This can be achieved, for example, if the foil is alloyed with approximately 0.05% aluminium or another deoxidizing agent.

The invention is of course not limited to the rotors described. Almost all shapes and dimensions of workpieces welded by means of electron beams can be made up according to the invention, the distinctive features of the invention being particularly effective in the case of deep welds, whether welded horizontally or vertically.

Similarly, instead of the preferred quadrant shape of the fusion lips, other shapes can be used, trapezoidal for example.

I claim:

1. In the method of welding together the adjoining end faces of two thick-walled rotationally symmetrical hollow bodies and which after completion of the welding operation establish closed and inaccessible hollow spaces and wherein the welding is effected by means of an electron beam movable along the outer surface of the bodies at the interface formed by the adjoining end faces and which produce a full-penetration type welded joint from the outer to the inner surfaces, the improvement wherein the end faces of the hollow bodies are provided with adjoining annular fusion lips extending radially inward at their inner surfaces, the side of each said fusion lip facing away from the end face to be welded having a substantially quadrant-shaped profile and the width of said lip at the exit point of the electron beam being at least equal to the diameter of the electron beam thereby resulting in formation of an inner bead therebetween.

2. The method as defined in claim 1 for welding together two thick-walled rotationally symmetrical hollow bodies wherein the end face of at least one of said bodies is provided with pressure-compensating slots which during the electron beam welding operation interconnect the closed hollow space within said bodies with a vacuum chamber until shortly before the welding operation is completed, the depth of said pressure-compensating slots perpendicular to the plane of the welding interface being less than half the diameter of the welding beam.

* * * * *